Figure 7:
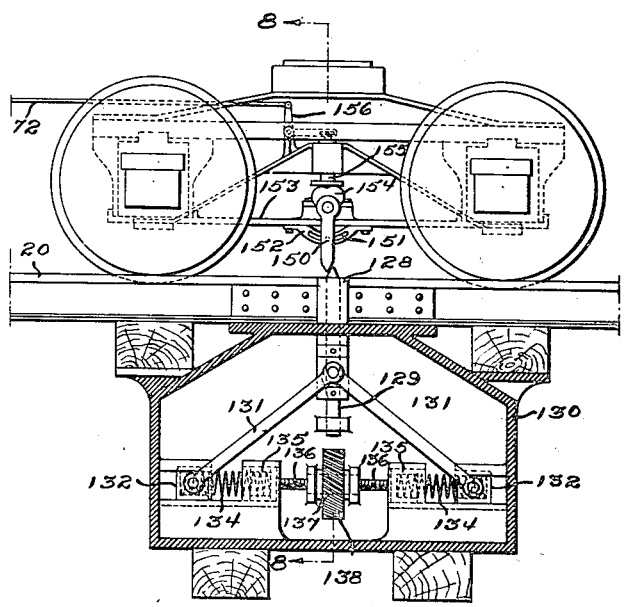

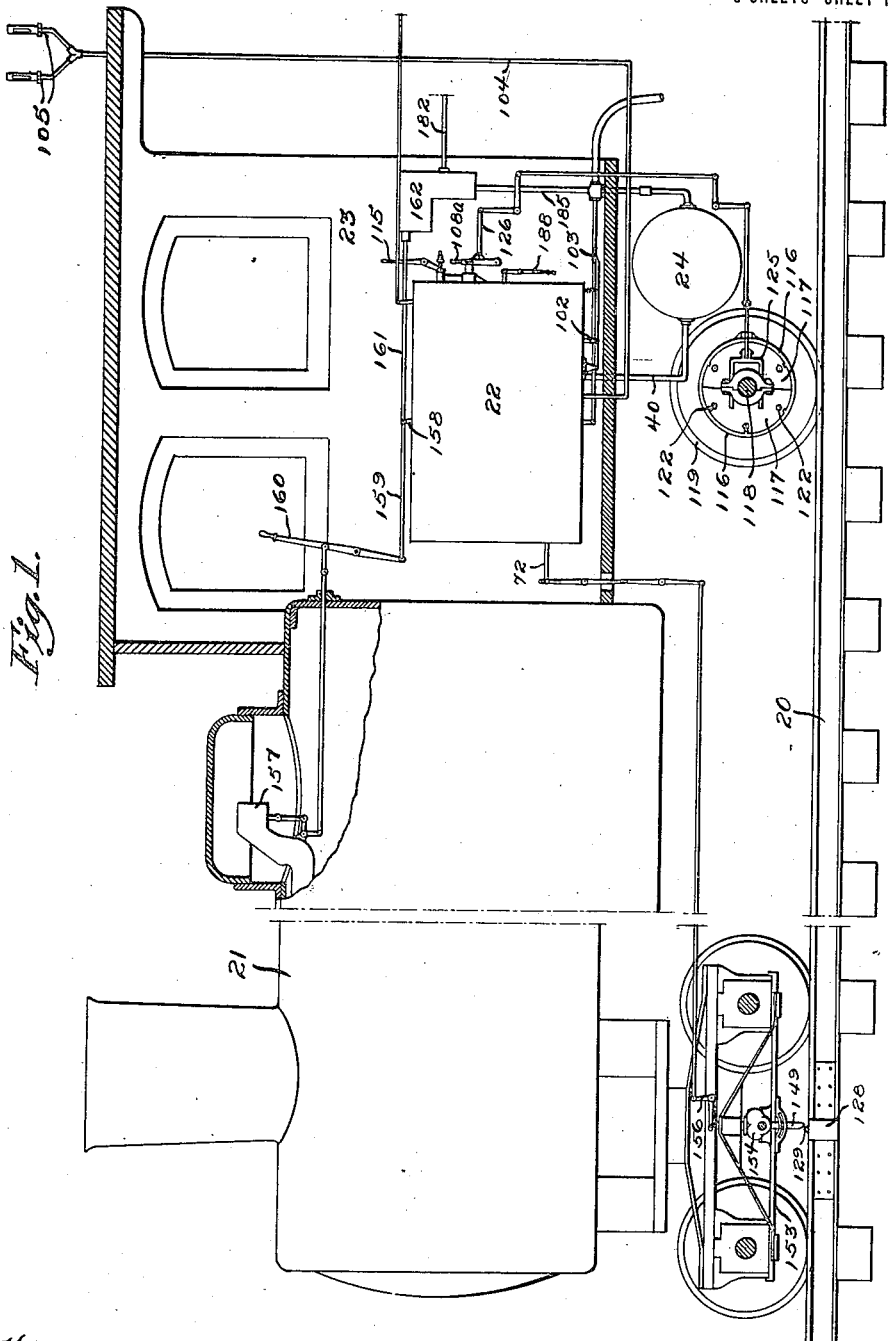

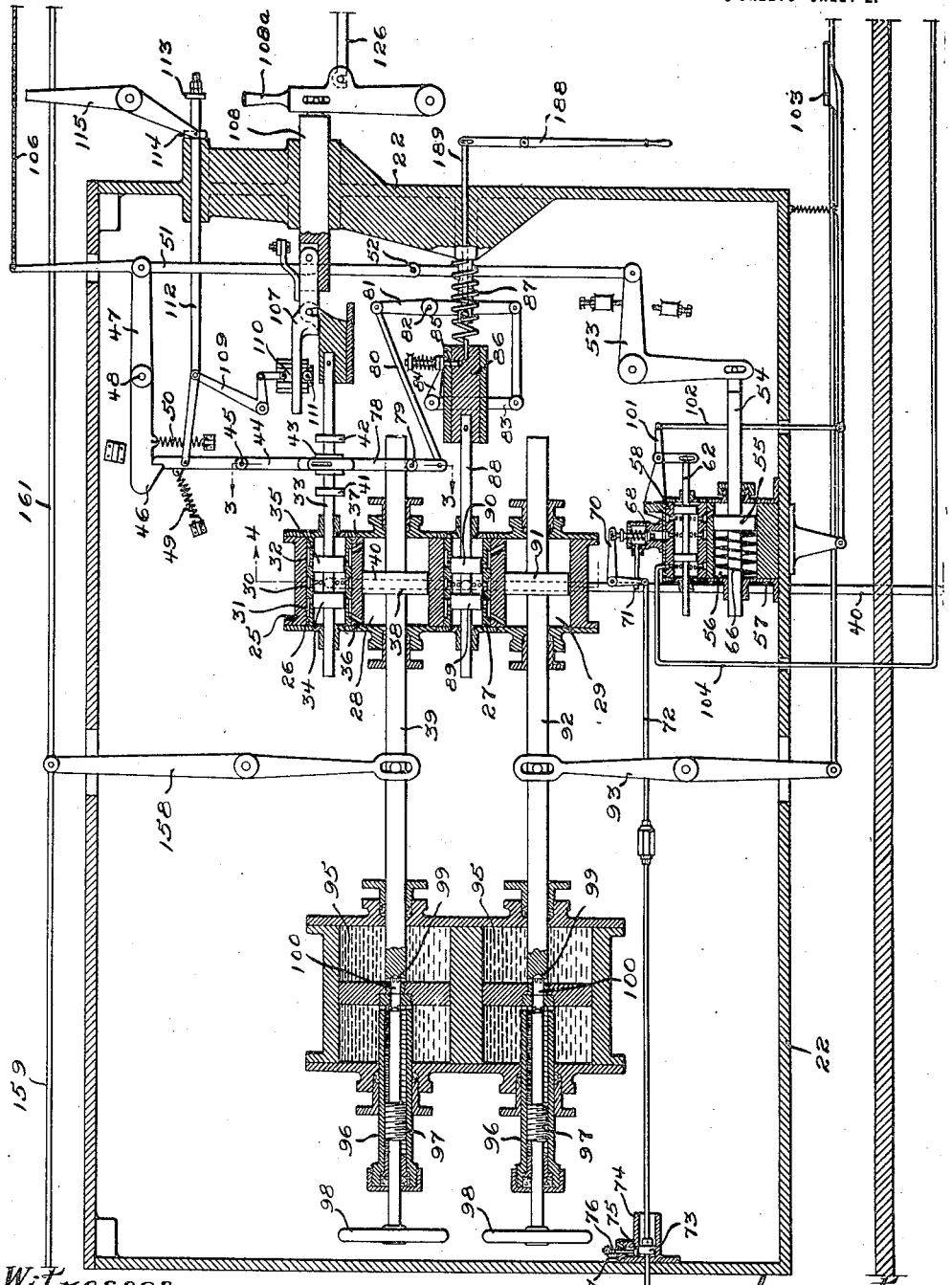

W. REYNOLDS.
TRAIN CONTROLLING MECHANISM.
APPLICATION FILED AUG. 17, 1921.
1,436,112.
Patented Nov. 21, 1922.
6 SHEETS—SHEET 3.
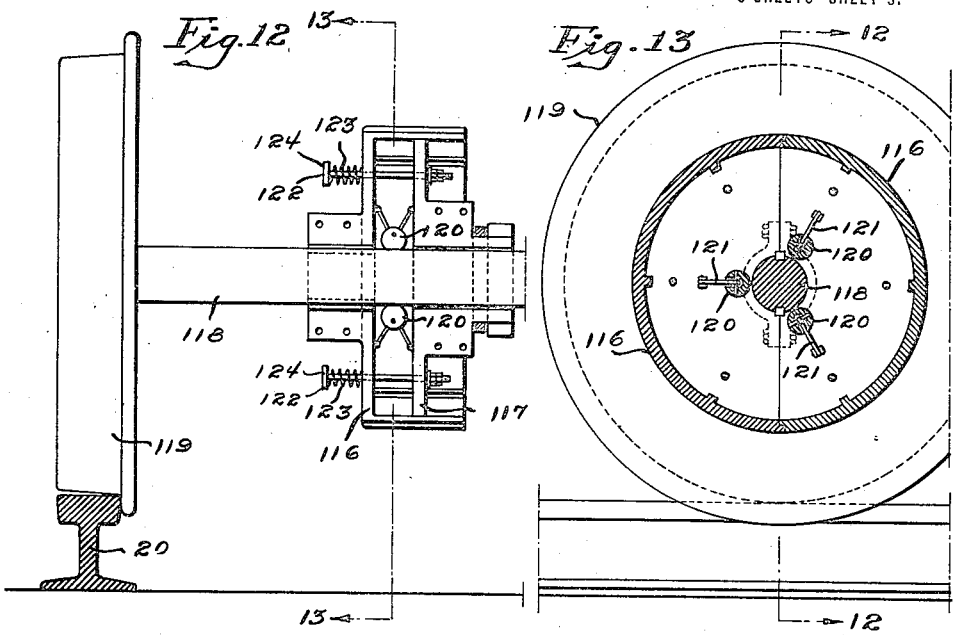
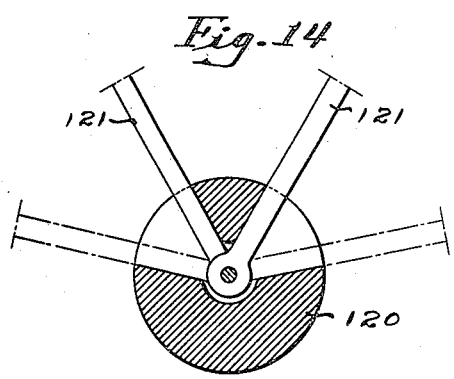
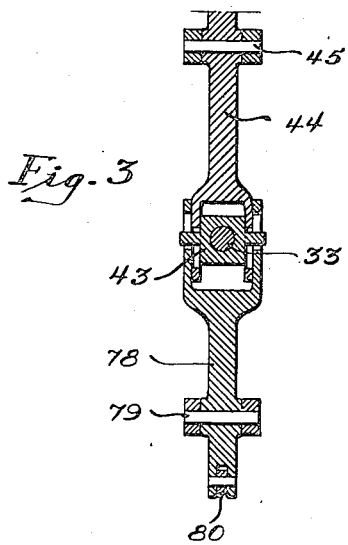
Witnesses,
Spencer W. Megonegal,
Augustus R. Coppes
Inventor,
William Reynolds,
by Joshua R. H. Potts
his Attorney.

W. REYNOLDS.
TRAIN CONTROLLING MECHANISM.
APPLICATION FILED AUG. 17, 1921.
1,436,112.
Patented Nov. 21, 1922.
6 SHEETS—SHEET 4.
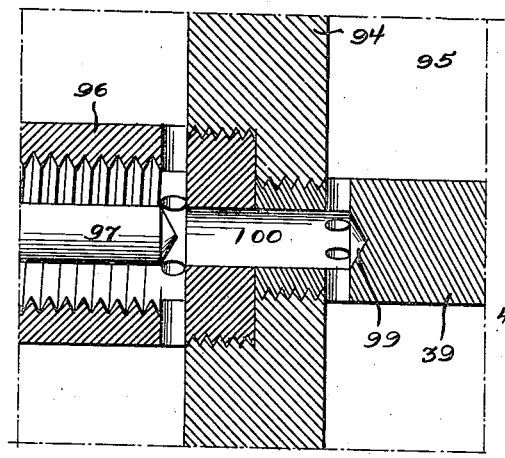
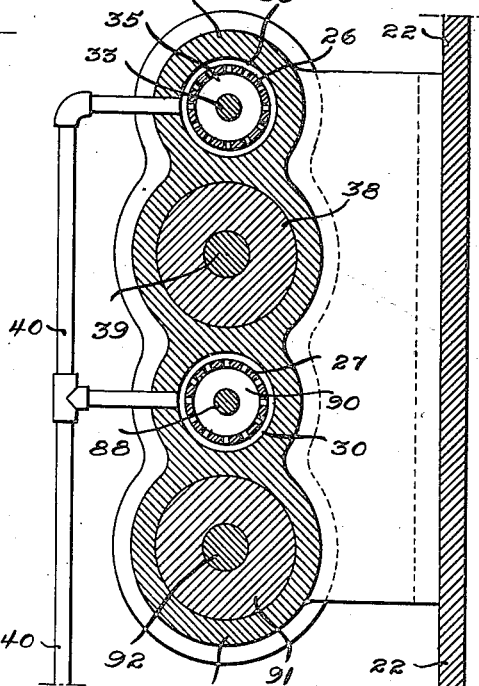
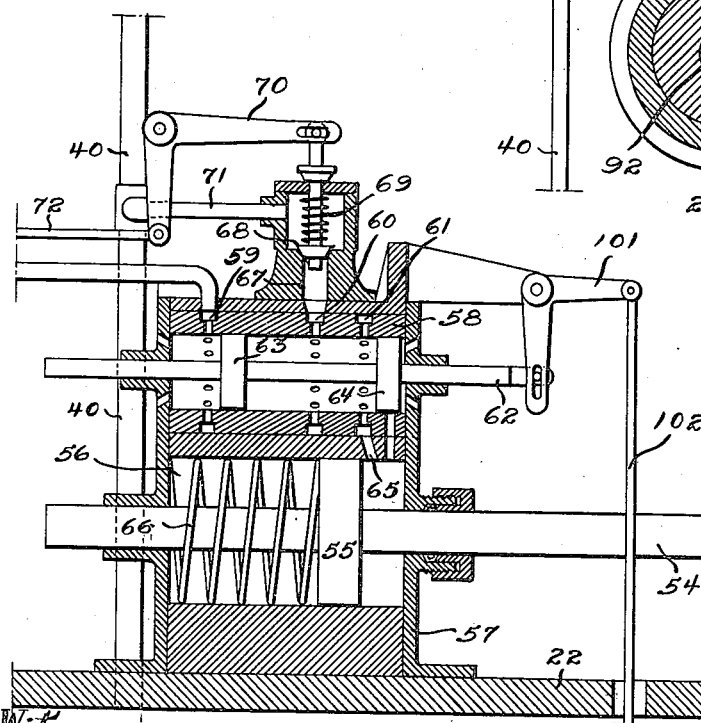
Witnesses,
Spencer W. Megonegal
Augustus B. Coppes
Inventor,
William Reynolds
by Joshua R. H. Potts
his Attorney

W. REYNOLDS.
TRAIN CONTROLLING MECHANISM.
APPLICATION FILED AUG. 17, 1921.

1,436,112.

Patented Nov. 21, 1922.
6 SHEETS—SHEET 5.

Witnesses,
Spencer W. Megonegal
Augustus B. Copper

Inventor,
William Reynolds
by Joshua R. H. Potts
his Attorney.

W. REYNOLDS.
TRAIN CONTROLLING MECHANISM.
APPLICATION FILED AUG. 17, 1921.
1,436,112.
Patented Nov. 21, 1922.
6 SHEETS—SHEET 6.
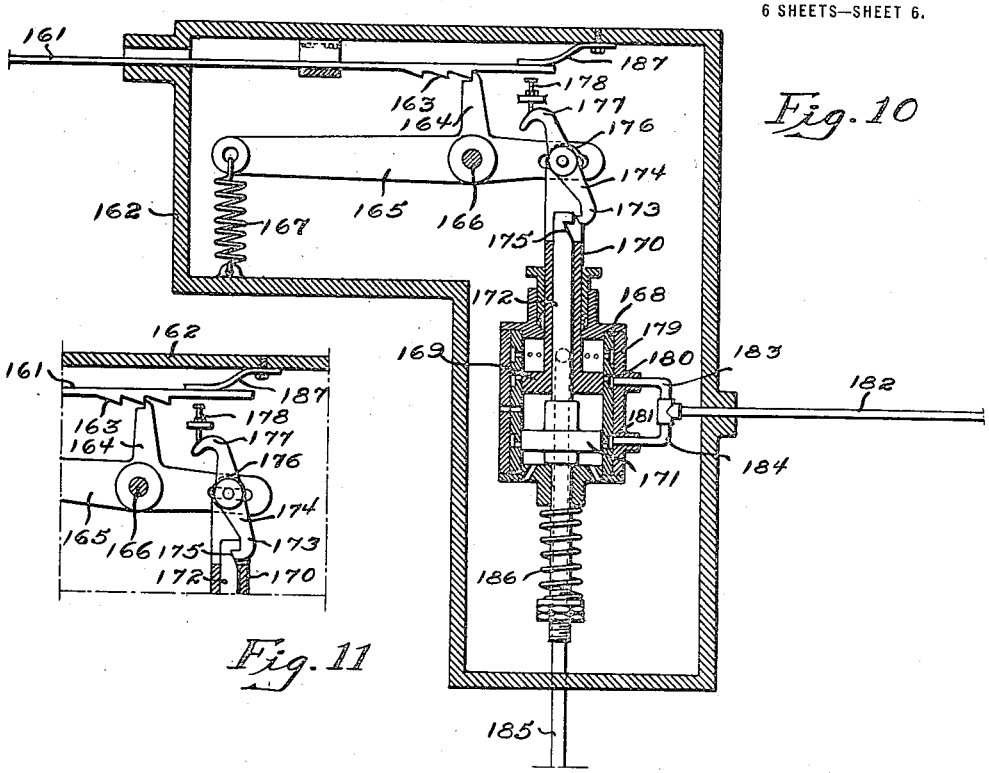
Fig. 10
Fig. 11
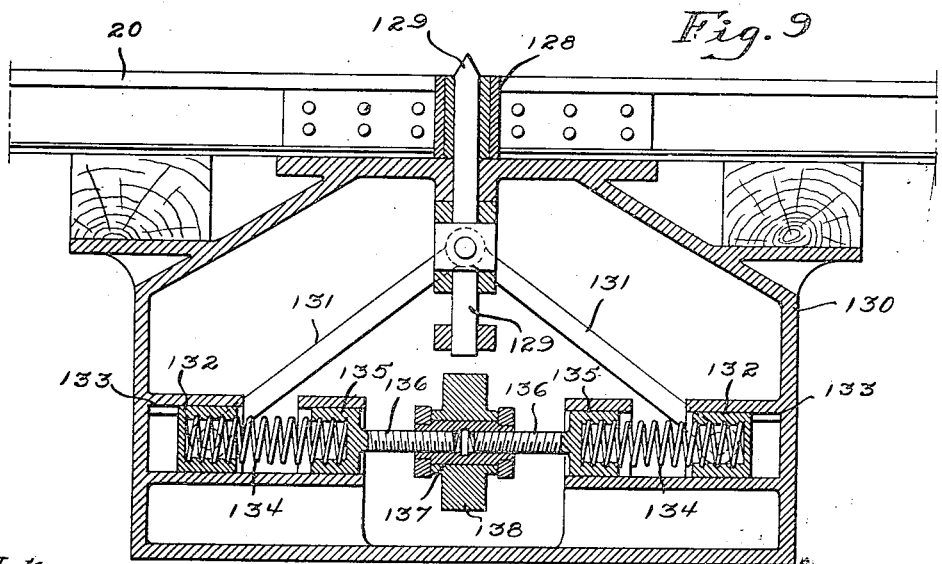
Fig. 9
Witnesses,
Spencer W. Mygonegal,
Augustus B. Copper
Inventor,
William Reynolds,
by Joshua R. H. Potts
his Attorney.

Patented Nov. 21, 1922.

1,436,112

UNITED STATES PATENT OFFICE.

WILLIAM REYNOLDS, OF PHILADELPHIA, PENNSYLVANIA.

TRAIN-CONTROLLING MECHANISM.

Application filed August 17, 1921. Serial No. 493,048.

*To all whom it may concern:*

Be it known that I, WILLIAM REYNOLDS, a citizen of the United States, residing at Philadelphia, in the county of Philadelphia and State of Pennsylvania, have invented certain new and useful Improvements in Train-Controlling Mechanism, of which the following is a specification.

It is well known that many accidents have occurred on railroads due to the fact of an engineer running his train past a set signal either intentionally or for the reason that he has not noticed the signal. Such accidents have also been known to occur owing to the fact that the engineer either through illness or death could not stop the train and the accidents occurred before any one else could reach the controlling mechanism in the engineer's cab. Other accidents have occurred due to the running of a train at a speed greater than that allowed by the authorities.

One object of my invention is to provide improved mechanism which will operate in a positive manner to effect the stopping of a train if the train attempts to pass a set signal, such for example as a semaphore signal.

Another object is to include, in my improved mechanism, means by which the engineer can intentionally forestall the action of the automatic means so as not to stop the train but such forestalling action will impart a signal to the conductor or trainmen and if the conductor or trainmen desires to stop the train they can do so by operating certain apparatus which constitutes a part of my invention.

Another object is to so construct my improved mechanism that it will allow the engineer to manually effect the stopping of the train and to otherwise regulate the running of the train up to a maximum speed.

A further object is to provide improved means for effecting the stopping of the train if it exceeds a predetermined maximum speed.

A still further object is to make the mechanism of my invention of a practical and durable construction which can be readily applied and which will not readily get out of order due to running conditions or climatic changes.

These objects, and other advantageous ends which will be described hereinafter, I attain in the following manner, reference being had to the accompanying drawings in which—

Figure 8:
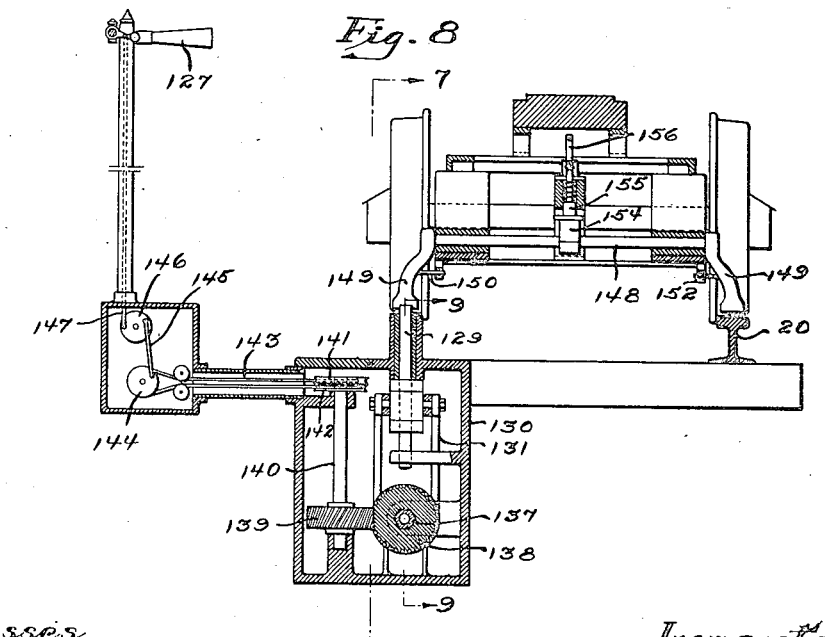

Figure 1 is an elevational view partly in section and partly diagrammatic illustrating certain of the features of my invention as applied to a locomotive and track, Figure 2 is a sectional elevation showing automatic controlling means made in accordance with my invention, Figure 3 is a fragmentary section taken on the line 3—3 of Figure 2, Figure 4 is an enlarged fragmentary section taken on the line 4—4 of Figure 2, Figure 5 is an enlarged view of certain of the features shown in Figure 2, Figure 6 is an enlarged fragmentary view showing certain of the features of the automatic dash pot construction shown in Figure 2, Figure 7 is an enlarged fragmentary elevation illustrating the automatic tripping structure which forms a part of my invention; certain of the parts being illustrated in section, the section being taken on the line 7—7 of Figure 8, Figure 8 is a section taken on the line 8—8 of Figure 7, Figure 9 is an enlarged section taken on the line 9—9 of Figure 8, Figure 10 is a sectional elevation showing certain of the parts of my invention operative for gradually varying the speed of the train by initial manual action and subsequent automatic action, Figure 11 is a fragmentary view showing certain of the features illustrated in Figure 10 in another position which they assume during operation, Figure 12 is a fragmentary sectional elevation of certain of the speed governing mechanism; the section being taken on the line 12—12 of Figure 13, Figure 13 is a section taken on the line 13—13 of Figure 12, and Figure 14 is an enlarged sectional view taken through one of the governing weights with its connected links showing minimum and maximum positions of the links.

Referring to the drawings, 20 represents a railroad track and 21 represents a locomotive which, as illustrated, includes a controlling box 22 within its cab 23. This controlling box 22, as shown in Figure 2, includes mechanism for effecting various operations hereinafter described; the same being effected in the present embodiment of my invention by compressed air from a tank 24 as shown in Figure 1.

Referring now more particularly to Figures 2 and 4 the controlling box 22 includes a housing 25 in the form of a casting having secured therein, two valve cylinders 26 and 27 and two piston chambers 28 and 29. The valve cylinder 26 has three external grooves 30, 31 and 32 which provide air passages encircling the cylinder 26 within the housing; the groove 30 being positioned between the grooves 31 and 32. These grooves 30, 31 and 32 have perforations leading to the interior of the cylinder at spaced distances apart; the perforations from the central groove or passage 30 being located between the perforations which lead inwardly from the grooves 31 and 32. A valve rod 33 has two pistons 34 and 35 thereon which are spaced apart and adapted to normally cover the perforations leading from the passages 31 and 32.

Ports 36 and 37 communicate with the chamber 28 at opposite sides of a piston 38 which is movable within the chamber 28. This piston 38 is connected to an operating rod 39. The arrangement is such that the perforations from the passage 30 always occupy a position communicating with the space between the pistons 34 and 35. A pipe 40 communicates with the air tank 24 and with the passage 30 and it will be noted that the rod 33 can be moved to move the pistons 34 and 35 into a position to permit communication between the perforations which lead from the passage 30 and with the port 37. Or the rod 33 can be moved in an opposite direction to permit the port 36 to be in communication with the passage 30 through the medium of its perforations. In this manner air can be admitted to the chamber 28 at either side of the piston 38.

The valve rod 33 has two collars 41 and 42 which are adjustably fixed thereto and spaced apart and a collar 43 is slidably mounted on the rod 33 between the collars 41 and 42. A lever 44 is fulcrumed at 45 and has one end in pin and slot connection with the collar 43. The other end of the lever 44 is adapted to be engaged by a hook 46 on a bell crank lever 47; said bell crank lever being fulcrumed at 48. A spring 49 is connected to the latter mentioned end of the lever 44 and the hook 46 normally prevents the spring 49 from swinging the lever 44 on its fulcrum. However it will be noted that when the hook 46 is released from the lever 44 that the spring 49 will swing the lever 44 until the collar 43 engages the collar 42 on the valve rod 33 and the valve rod will be moved in a direction to admit air through the port 37 so as to move the operating rod toward the left viewed from Figure 2.

A spring 50 normally holds the hook 46 down in locking engagement with the lever 44. The bell crank lever 47 is connected by a link 51 which has a knuckle joint 52 within its length for a purpose hereinafter described. This link 51 is connected to a bell crank lever 53 and the bell crank lever 53 is connected to a piston rod 54. The piston rod 54 has a piston 55 movable within a chamber 56 in a housing 57. A valve cylinder 58 as clearly shown in Figure 5 has annular grooves 59, 60 and 61 formed therein; said grooves including perforations which communicate with the interior of the cylinder; the perforations from the groove 60 being located between the perforations from the grooves 59 and 61. A valve rod 62 has piston valves 63 and 64 thereon movable within the cylinder 58. The groove or passage 61 communicates with the piston chamber 56 through the medium of a port 65 adjacent one side of the piston 55 and the opposite side of the piston 55 is backed by a spring 66. A passage 67 communicates with the groove 60 and is normally closed by a valve 68 which is backed by a spring 69. The valve has a stem which leads out of the housing 57 and is connected to a bell crank lever 70. A branch pipe 71 communicates with the interior of the housing at one side of the valve 68 and with the pipe 40. A rod or link 72 is connected to the bell crank lever 70 and has a small piston 73 thereon adapted to operate in a dash pot 74. The dash pot 74 preferably includes a valve 75 which is backed by a spring 76; said valve being normally operative to close a passage 77 which leads to the interior of the dash pot. An outward movement of the piston 73 will cause the valve 75 to open to admit atmospheric air. However a reverse movement of the piston 73 will be retarded owing to the closing of the valve 75. It may be here stated that the rod 72 will be moved, by mechanism hereinafter described, to effect the admission of compressed air into the chamber 56 through the port 65 when a train having the mechanism thereon passes a set signal; the resulting action being that the rod 54 will be moved and the lever 47 will be rocked through the medium of action of the lever 53 and link 51 and the spring 49 will then move the lever 44 to effect the shifting of the valve rod 33 to admit air into the chamber 28; the rod 39 being connected with mechanism hereinafter described to the throttle for cutting off the steam and also by an auxiliary attachment to the air brakes.

The collar 43 of the valve rod 33 is connected, by a pin and slot connection with a lever 78 which is fulcrumed at 79. This lever is connected by a link 80 to another lever 81; said latter lever being fulcrumed at 82 and being in connection with a bell crank lever 83. This bell crank lever has an arm 84 provided with a locking pin 85 which is normally held in locking engagement with a member 86 to which is connected a coiled spring 87; said coiled spring also being attached to the controlling box 22. The member 86 has a valve rod 88 connected thereto; said valve rod including valve pistons 89 and 90 which are operative within the valve cylinder 27; said valve cylinder being constructed similarly to the cylinder 26 and serving when the valve rod 88 is moved in one direction to effect admission of compressed air into the chamber 29 at one side of a piston 91 and when the valve rod 88 is moved in an opposite direction to effect the admission of compressed air into the chamber 29 at the opposite side of said piston 91. The piston 91 is connected to an operating rod 92. A lever 93 is connected to the connecting rod 92 and to the air brake valve; said air brake valve not being illustrated. Both of the operating rods 39 and 92 have dash pot pistons 94 which are operative in chambers 95 which are preferably filled with oil or other liquid. These pistons have tubes or hollow rods 96 connected thereto which are internally screw threaded and screw threaded stems 97 fit within the screw threaded tubes 96 and at their outer ends are provided with hand wheels 98. The inner ends of the stems 97 form valves and, as shown in Figure 6, are adapted to move toward or from valve seats 99; said valve seat communicating with a passage 100 which communicates with the chambers 95 at opposite sides of the respective pistons 94. Thus when the pistons 94 are moving toward one end of the chamber, the oil can pass through the passages and the amount of this oil passing through the passages can be regulated by turning the hand wheels 98 so as to move the stems 97 toward or from their seats. Thus the operating rods 39 and 92 can be regulated in their movement according to the speed most suitable for the operation of the mechanism as will be more thoroughly comprehended by the following description.

The engineer can forestall the operation of the rod 54 by the means now to be described. The valve rod 62 is connected by a bell crank lever 101 and link 102 with a treadle lever 103. A pipe 104 leads from the groove or passage 59 of the cylinder 58 to any signalling or alarm device, such for example as the whistles 105 as shown in Figure 1.

By the movement of the treadle lever 103, the piston 64 can be moved into a position covering the perforations which lead from the groove or passage 61 and if the train passes a signal when these latter mentioned perforations are covered the air will not enter the chamber 56 and the train will not be stopped. However, this same action of the treadle lever 103 will move the piston valve 63 into a position permitting communication between the passages 59 and 60 and the air admitted between the piston valves 63 and 64 will pass through the pipe 104 and blow the whistles or operate any other suitable signal so that the conductor and trainmen will know that the engineer has intentionally forestalled the automatic action of the mechanism and has passed the set signal. The conductor or any of the trainmen can then pull the cord 106 which is attached to the lever 47 and the lever 47 can be moved due to the provision of the knuckle 54 in the link 51 and the spring 49 will then act to effect the movement of the lever 44 and the consequent operation of the mechanism above described to move the operating rod 39. Furthermore the pin 85 will be withdrawn from the member 86 and the spring 87 will then act to move the rod 88 to effect movement of the operating rod 92 and lever 93 to apply the air brakes.

The valve rod 33 is in connection through the medium of a pivoted latch 107 with a slidable member 108 to which is connected a hand lever 108ª. This latch 107 can be raised by the movement of a bell crank lever 109 which is connected to a slidable head 110 which has a roller 111 on its lower portion under the free end of the latch 107. The lever 109 is in pivotal connection with the lever 44 and also with a rod 112 which has a head 113 normally spaced from the controlling box 22. A collar 114 is slidably mounted on the rod 112 and normally occupies a position adjacent the controlling box so that when the spring 49 operates after the release of the hook 46 the head 113 can move to permit the lever 109 to swing so as to effect the lifting of the latch out of its connection with the valve rod 33. When it is desired to re-set the parts a lever 115, which is connected to the collar 114, can be operated to move the rod 112 in an opposite direction so as to bring the lever 44 back into position back of the hook 46 and permit the latch 107 to again connect with the rod 33. The member 108 through the medium of the hand lever 108ª is connected to a governor hereinafter described; said governor preferably being of the centrifugal type and operative due to the speed of the train along the track.

In Figures 12, 13 and 14, I have illustrated a form of governor which is suitable for carrying out my invention and the same includes two sections 116 and 117; both of the sections being made in parts so as to be positioned around an axle 118 to which wheels 119 are secured; said wheels running freely on the track 20. The section 116 is keyed to the axle 118 and the section 117 is free to move lengthwise of the axle and to rotate, as a unit, with the section 116. Governing weights 120 are pivotally connected by links 121 with the sections 116 and 117 as clearly shown in Figure 12. Rods 122 are bolted to the section 117 and slide through the section 116. Coiled springs 123 are positioned between the heads 124 of the rods 122 and the outer surface of the section 116; thus serving as cushioned limiting means for the relative longitudinal movement of the sections 116 and 117. The section 117 is connected by a yoke 125; said yoke being in connection by any suitable means such as links and levers as illustrated in Figure 1, with the hand lever 108ª; said latter connection including a part 126 which can be readily detached from the hand lever 108ª if desired.

I will now describe the tripping means for effecting the automatic action; said tripping means being movable in conjunction with a signal, such for example as the semaphore signal arm 127 as shown in Figure 8.

Referring more particularly to Figures 7, 8 and 9, a plunger housing 128 is secured to the track in the plane of the rail preferably at a junction between two sections of the rail. A plunger 129 is slidably mounted in the housing 128 and extends downward into a case 130 which may be located within the road bed of the track as clearly shown in Figures 7 and 8. This plunger 129 is connected by operating links 131 with blocks 132 which are slidable in guideways 133 in the case 130. The blocks 132 are preferably cupped or recessed to allow the ends of coiled springs 134 to be secured therein; said springs also being secured within other blocks 135 which are slidable in extensions of the guideways 133. The blocks 135 have screw threaded stems 136 secured thereto in axial alignment; said stems respectively having right and left hand threads thereon adapted to fit within tapped openings in a nut 137 which is secured to a worm wheel 138 so that when the worm wheel is rotated in one direction the stems 136 will be moved toward each other and when the worm wheel is rotated in an opposite direction, the stems will be moved in a direction away from each other as will also be the blocks 135; it being noted that the blocks 135 are connected to the blocks 132 by the springs 134. The worm wheel 138 is in mesh with a worm 139 on an upright shaft 140; said upright shaft having grooved pulleys 141 and 142 secured thereto. To these pulleys are attached the opposite ends of a cable 143; the cable being adapted to be wound in one direction on one of the pulleys and in the opposite direction on the other of the pulleys. This cable 143 passes around a grooved wheel 144 to which is connected a pivoted connecting rod 145. This connecting rod 145 is also connected to a wheel 146 which in turn is connected to the semaphore arm 127 by a rod 147. Thus when the arm 127 is moved by any mechanism (not illustrated) the rod 147 will move the wheel 146 and the connecting rod 145 will operate the wheel 144 to turn the shaft 140 according to the direction of movement of the semaphore arm 127. This action will impart movement to the worm wheel 138 which movement will be transmitted to the operating links 131 and to the plunger 129; either causing the plunger to be raised with its upper tapered end above the top of the rail or below the top of the rail according to the direction of movement of the semaphore arm. It will be noted that since the plunger is in the plane of the rail that if it is projected above the top of the rail the wheels will engage and press downward the plunger and this action is allowed due to the provision of the springs 134 since these springs will merely expand when the plunger 129 is pushed downward. The locomotive carries a rock shaft 148 which has arms 149 which extend downward over the tops of the rails so that said plungers can be positioned within either rail and will be capable of engagement with either of the arms 149 according to the side of the track adjacent which the signal is located.

In the form illustrated it is only necessary to be concerned with one of the arms 149 since only one of the tripping devices including the plunger 129 is illustrated. This arm 149 has a pin 150 adapted to engage in a slot 151 formed in a bracket 152 which is secured to the truck 153 of the locomotive. The rock shaft 148 carries a cam 154 adapted to engage against a spring-pressed plunger 155. This plunger is connected by a bell crank lever 156 to the rod 72 which leads into the controlling box 22. It will be noted that if the plunger 129 is projected that said latter arm 149 will engage the top of the plunger and the shaft 148 will be rocked to effect movement of the rod 72 to open the valve 68 to effect the movement of the bell crank lever 47, through the action of the piston 55 and the mechanism will operate to stop the train; it being noted that the operating rod 39 is in connection with the throttle valve 157 as shown in Figure 1 through the medium of the lever 158, link 159 and throttle lever 160. The lever 158 has a rod 161 secured thereto and, as shown in Figures 10 and 11, this rod 161 has a portion slidably supported within a box 162. Said portion of the rod 161 has notches 163 adapted to be engaged by an arm 164 on a lever 165; said lever being fulcrumed at 166 within the box 162 and having a spring 167 attached thereto; said spring also being connected to the box 162 and serving to hold the lever 165 in the position shown in Figure 10.

A cylinder 168 has a piston 169 therein which is provided with a tubular connecting rod 170 which slidably extends outside of the cylinder and is in pin and slot connection with the lever 165. A second piston 171 is also positioned within the cylinder 168 and has a stem 172 which leads outward through the tubular connecting rod 170. This stem 172 is adapted, under certain conditions, to be engaged by the lower hooked end 173 of a pawl 174. The stem 172 is notched at 175 to allow the hooked end 173 of the pawl to engage within the notch 175; said pawl being pivotally mounted on the upper end of the connecting rod 170 and including a torsion spring 176 which, when the connecting rod 170 is moved downward so as to free the upper end 177 of the pawl from an adjusting abutment screw 178, will swing the hooked end 173 into the notch 175. The cylinder 168 has annular grooves 179, 180 and 181 which provide passages and an air pipe 182 has branches 183 and 184 which respectively communicate with the passages 180 and 181. The passage 180 is located between the passages 179 and 181 and each of the passages has perforations leading to the interior of the cylinder; the perforations of the passage 180 normally being closed by the piston 169 while the perforations of the passage 181 are normally closed by the piston 171 as clearly shown in Figure 10. The passage 179 is connected with a pipe 185 which leads to the tank 24; said pipe 182 leading to the air brakes.

During the manual movement of the lever 160, which is connected to the throttle and which also is in connection with the rod 161 as shown in Figure 1, the lever 165 will be swung against the action of the spring 167 and during this movement the piston 169 will be lowered so that the pipes 182 and 185 will be in communication with each other through the medium of the passages 179 and 180 and the brakes will be applied. This action, considering that the rod 161 has only been moved to the extent of one of its notches 163, will only be temporary however since during the swinging movement of the lever 165, the pawl 174 will engage within the notch 175 and just as soon as the upper end of the portion 164 of the lever moves into a position so as to clear the notched portion as shown in Figure 11, the spring 167 will return the lever to its normal position and will cause the pistons 169 and 171 to be raised so that the piston 169 will again cover the perforations of the passage 180 and the perforations of the passage 181 will be uncovered by the piston 171 and allow release of the pressure within the pipe 182 to effect disengagement of the brakes. As soon as the upper end of the pawl 174 again engages the adjustable abutment screw 178, the hooked end 173 will be disengaged from the notch 175 and the spring 186 will move the piston 171 downward to again cut off the passage 181 and prevent escape of the air; thus by operating the lever 160 in a step by step movement, the throttle valve can be gradually closed and the brakes can be applied and disengaged at intervals to gradually decrease the speed of the train. The notched portion of the rod 161 while slidable within the box 162 is preferably engaged by a spring 187 which resiliently holds the notched portion against the part 164 of the lever 165 but allows for a raising movement.

It will be noted that if the engineer desires to operate the mechanism through the medium of the hand lever 108$^a$, he can do so by detaching the portion 126 which is connected to the governor and by pulling on the hand lever 108$^a$. This will draw valve rod 33 rearwardly thereby actuating lever 78 and rod 39. The lower end of lever 78 moving forwardly will, by means of link 80, lever 81, bell crank lever 83 and arm 84, release pin 85. This permits spring 87 to move valve rod 87 and actuate rod 72 thereby applying the brakes and cutting off the steam.

To re-set the apparatus, the lever 115 can be actuated to pull the lever 44 into engagement with the lever 47 and the lever 188 as shown in Figure 2 can be operated to move a bar 189 into engagement with the member 86 to push the latter and thereby move the valve rod 88 to cause the part 36 of the cylinder 27 to be thrown into communication with the compressed air between the pistons 89 and 90 and the air will then enter the chamber 29 and effect movement of the operating rod 92 into its normal position. In like manner the hand lever 108$^a$ can be operated to move the valve rod 33 into such position as to effect admission of the compressed air into the chamber 28 through its port 36 and thereby effect movement of the operating rod 39 into its normal position. After the operating rods have been returned to their normal positions the valve rod 33 can be moved into its normal position through the medium of the hand lever 108$^a$ and the spring 87 will serve to move the member 86 and valve rod 88 into a position in which the pin 85 will engage the member 86 and lock it in position.

By the use of mechanism as above described, if the semaphore arm 127 is in its set position with the plunger 129 projecting above the top of the rail, if a train having the other part of the mechanism thereon runs past the signal, the arm 149 will be swung and this motion will be transmitted to open the valve 68 and the piston 55 and rod 54 will be automatically moved to release the hook 46 from the lever 44. The spring 49 will then operate as above described to move the collar 43 into engagement with the collar 42 and the valve rod 33 will be shifted to admit air into the chamber 28 and effect movement of the lever 158. This action is slightly preceded by the movement of the bell crank lever 109 to lift the latch 107 so as to free the valve rod 33 and thus readily permit movement thereof when the collar 43 strikes the collar 42. This movement of the lever 44 and collar 43 also effects the withdrawal of the pin 85 and the spring 87 will move the valve rod 88 to admit air into the chamber 29 so as to move the operating rod 92; this movement being transmitted through a member 93 to the air brake.

If the engineer forestalls the above mentioned automatic action, which he can do by pressure on the treadle lever 103, such action will move the rod 62 into a position so that the air will pass through the pipe 104 and sound an alarm signal to the conductor and trainmen. They can, if desired, operate the cable or cord 106 and effect the release of the hook 146 from the lever 42 and the above mentioned automatic action will then result to effect the stopping of the train. During normal running conditions, the part 126 is connected to the hand lever 108ᵃ and if the speed of the train exceeds a certain limit the movement will effect the operation of the valve rod, which movement will be transmitted so as to effect the operation of the operating rods 39 and 92.

By having the plunger 129 directly in the upright plane of the rail, as shown in Figures 7 and 8, and by having a spring or resilient backing for the plunger, it is practically impossible for the mechanism to be affected by snow, ice or any temperature conditions. The upper end of the plunger is tapered so that the wheels when running over the same will merely push the plunger downward against the tension of the springs 134; said springs however being sufficiently strong to resist the action of the arm 149.

In the foregoing description and in the claims I have used the term "train-stopping mechanism". However, it will be understood that this term is to be construed to include a locomotive, car or any vehicle which is operative over a track.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In signal controlled obstacle mechanism, a signal, a plunger, a screw threaded member, rotatable means in threaded engagement therewith, and connections between the rotatable means and the signal whereby the movement of the signal in one direction will move the plunger into operative position and rotation of the signal in reverse direction will move the plunger into inoperative position.

2. In signal controlled obstacle mechanism, a signal, a plunger, a worm wheel, a nut secured therein, oppositely disposed stems threaded in the nut, links connected with the stems and pivotally connected with the plunger, and connections between the stems and the signal whereby movement of the signal in one direction will move the plunger into operative position and rotation of the signal in reverse direction will move the plunger into inoperative position.

3. In signal controlled obstacle mechanism, a signal, a plunger, a worm wheel, a nut secured therein, oppositely disposed stems threaded in the nut, slidable blocks attached to the stems, guideways for the blocks, other blocks slidable in the guideways, springs connecting the blocks in each guideway, links connected with the outer blocks and pivotally connected with the plunger, a worm meshing with the worm wheel, and connections between the worm and the signal whereby movement of the signal in one direction will actuate the worm and worm wheel and draw the links together thereby raising the plunger, and movement of the signal in reverse direction will reverse the action.

4. Train controlling mechanism, adapted to be actuated by a signal controlled obstacle, including mechanism for stopping a train, an alarm device, means for forestalling the action of the stopping mechanism, means rendered operative by the forestalling means to actuate the alarm device, and means extending through the train for actuating the stopping means independently of the signal controlled obstacle.

5. Train controlling mechanism, adapted to be actuated by a signal controlled obstacle, including mechanism for stopping a train; governing means movable at a speed proportioned to the speed of the train; connections between the governing means and the train stopping means operative when the train attains a predetermined speed, and a detachable connection whereby operation of the train stopping mechanism independently of the signal controlled obstacle is permitted.

6. Train stopping mechanism including brake-applying means; means for cutting off the motive power of the train; brake-applying means independent of said first means and operative in conjunction with said second means; automatically operative means; and means for effecting operation of said automatically operative means to cause operation of all of said means.

7. Train stopping mechanism including brake applying means; means for cutting off the motive power; automatic means for conjointly operating the brake applying means and the means for cutting off the motive power; brake applying means independent of the first mentioned means and means for conjointly actuating the second brake applying means and the means for cutting off motive power exclusively of the first mentioned brake applying means.

8. Train-stopping mechanism including means providing a chamber; a piston in said chamber; an operating rod connected to the piston and leading out of the chamber; a cylinder having passages spaced apart and perforations communicating with said passages and with the interior of the cylinder, said first means having parts communicating with said chamber and the other passages; a valve rod having piston valves thereon fitting within said cylinder; means for conducting pressure fluid to one of said passages so as to pass between said piston valves; and means for effecting movement of said valve rod whereby the pressure fluid can enter said first chamber and move said operating rod; substantially as described.

9. Train-stopping mechanism including a pressure fluid conduit; means operative by said pressure fluid to effect the stopping of the train; a valve rod operative to effect the application of the pressure fluid to said first means; a lever co-operative with said valve rod; a spring for moving said lever to actuate said valve rod; means for holding said lever against the action of said spring; and tripping means operative to effect the release of said holding means; substantially as described.

10. Train-stopping mechanism including a pressure fluid conduit; means operative by said pressure fluid to effect the stopping of the train; a valve rod operative to effect the application of the pressure fluid to said first means; a lever co-operative with said valve rod; a spring for moving said lever to actuate said valve rod; means for holding said lever against the action of said spring; tripping means operative to effect the release of said holding means; and means independent of said tripping means operative to release said holding means; substantially as described.

11. Train-stopping mechanism including a pressure fluid conduit; means operative by said pressure fluid to effect the stopping of the train; a valve rod operative to effect the application of the pressure fluid to said first means; a lever co-operative with said valve rod; a spring for moving said lever to actuate said valve rod; means for holding said lever against the action of said spring; tripping means operative to effect the release of said holding means; and means for moving said valve rod independently of said lever; substantially as described.

12. Train-stopping mechanism including means operative by pressure fluid for effecting the stopping of the train, said means including a rod; a dash pot chamber; a piston connected to said rod and movable within said chamber; a passage extending through said piston to communicate with the chamber at opposite sides of said piston whereby fluid within said chamber during the movement of the piston may pass through said passage; and means for regulating the amount of fluid capable of passing through said passage; substantially as described.

13. Train-stopping mechanism including means operative by pressure fluid for effecting the stopping of the train, said means including a rod; a dash pot chamber; a piston connected to said rod and movable within said chamber; a passage extending through said piston to communicate with the chamber at opposite sides of said piston whereby fluid within said chamber during the movement of the piston may pass through said passage; and a valve movable with respect to said passage to vary the amount of fluid capable of passing therethrough; substantially as described.

14. Train-stopping mechanism including means operative by pressure fluid for effecting the stopping of the train, said means including a rod; a dash pot chamber; a piston connected to said rod and movable within said chamber; an internally screw threaded tube connected to said piston; and a valve within said tube and in screw threaded connection therewith, said piston having a passage communicating with said chamber at opposite sides of said piston whereby fluid within said chamber during the movement of the piston may pass through said passage, said valve, when rotated, serving to move into a position to vary the amount of fluid capable of passing through said passage; substantially as described.

15. Train-stopping mechanism including brake-applying means; means for cutting off the motive power of the train; and means connecting said first two means and operative to initially cut off the motive power and apply the brake and subsequently automatically operative to release the brake-applying means; substantially as described.

16. Train-stopping mechanism including brake-applying means; means for cutting off the motive power of the train; means connecting said first two means and operative to initially cut off the motive power and apply the brake and subsequently automatically operative to release the brake-applying means, said third means including a notched rod; a lever having a portion for engagement with the notches of said rod; a cylinder; pressure fluid conducting means in communication with the interior of said cylinder; a piston valve operative within said cylinder and having a portion connected to said lever; a second piston valve in said cylinder and having a notched portion extending out of the cylinder; a pawl movable in conjunction with said lever whereby when said rod is moved due to said initial action, said first piston valve will be actuated to effect distribution of said pressure fluid to apply the brakes and to cause said pawl to engage the notched portion of said second mentioned piston valve; and means for moving said lever in an opposite direction for causing the movement of both of said piston valves to effect the release of the brakes by said pressure fluid; substantially as described.

In testimony whereof I have signed my name to this specification in the presence of two subscribing witnesses.

WILLIAM REYNOLDS.

Witnesses:
   CHAS. E. POTTS,
   EVELYN CROMPTON.